United States Patent
Dupire et al.

(10) Patent No.: US 7,488,790 B2
(45) Date of Patent: Feb. 10, 2009

(54) PROCESSING OF BIMODAL POLYMERS

(75) Inventors: Marc Dupire, Hyon (BE); Tom Lindt, Pittsburgh, PA (US); Guy Debras, Frasnes-lez-Gosselies (BE)

(73) Assignee: Total Petrochemicals Research Feluy, Feluy (BE)

( * ) Notice: Subject to any disclaimer, the term of this patent is extended or adjusted under 35 U.S.C. 154(b) by 192 days.

(21) Appl. No.: 10/512,387

(22) PCT Filed: Apr. 22, 2003

(86) PCT No.: PCT/EP03/04233

§ 371 (c)(1),
(2), (4) Date: Sep. 12, 2005

(87) PCT Pub. No.: WO03/091328

PCT Pub. Date: Nov. 6, 2003

(65) Prior Publication Data

US 2006/0100376 A1    May 11, 2006

(30) Foreign Application Priority Data

Apr. 26, 2002    (EP) ................................. 02076660

(51) Int. Cl.
*C08F 6/00*    (2006.01)
*C08J 3/00*    (2006.01)
*C08L 23/06*    (2006.01)
*C08L 23/08*    (2006.01)

(52) U.S. Cl. ................... 528/483; 528/501; 528/502 C; 528/502 R; 528/490; 528/481; 523/307; 523/340; 523/347; 525/240

(58) Field of Classification Search ................. 525/240, 525/190; 524/515; 523/347, 380, 307, 318, 523/340; 521/79; 528/490, 483, 481, 502 R
See application file for complete search history.

(56) References Cited

U.S. PATENT DOCUMENTS

| | | | |
|---|---|---|---|
| 5,106,906 A * | 4/1992 | Meier et al. .................... 525/51 |
| 5,290,827 A | 3/1994 | Shine | |
| 5,412,027 A * | 5/1995 | Shine et al. .................... 525/63 |
| 5,719,241 A | 2/1998 | Razavi et al. | |
| 6,114,414 A * | 9/2000 | Daly et al. .................. 523/330 |
| 6,303,666 B1 * | 10/2001 | Yorita et al. ................... 521/79 |
| 6,380,311 B1 | 4/2002 | Razavi et al. | |
| 6,433,095 B1 * | 8/2002 | Laurent ...................... 525/240 |
| 2004/0157988 A1 | 8/2004 | Miserque et al. | |
| 2004/0181010 A1 | 9/2004 | Miserque et al. | |

FOREIGN PATENT DOCUMENTS

| | | | |
|---|---|---|---|
| EP | 881 237 A1 * | 12/1998 |
| EP | 1 201 713 A1 * | 5/2002 |
| WO | WO 01/09200 A1 | 2/2001 |

* cited by examiner

*Primary Examiner*—Vasu Jagannathan
*Assistant Examiner*—Rip A. Lee
(74) *Attorney, Agent, or Firm*—Tenley R. Krueger (57) ABSTRACT

The present invention discloses the use of a supercritical fluid to improve the homogeneity of heterogeneous bi- or multi-modal resins resulting from a physical or a chemical blend of two or more fractions of the same type of polymer resin, said fractions having different molecular weights or of two or more polymer resins having different chemical compositions, or both. It also discloses the use of a supercritical fluid to improve the dispersion of additives or fillers into a polymer resin. It further discloses the process for preparing the homogeneous resin.

2 Claims, 6 Drawing Sheets

Magnification : 25x
Scale bar : 100μm

Magnification : 25x
Scale bar : 100μm

Figure 5

5a | Magnification : 25x
Scale bar : 100μm

5b | Magnification : 25x
Scale bar : 100μm

5c | Magnification : 25x
Scale bar : 100μm

Figure 6

Magnification : 25x
Scale bar : 100μm

PROCESSING OF BIMODAL POLYMERS

This invention is related to homogenous blends of two or more fractions of the same type of polymer and characterised by different molecular weights or of two or more polymers having different chemical compositions or of polymers and fillers or additives.

It is known in the art that polyolefins such as polyethylenes which have high molecular weight generally have improved mechanical properties over their lower molecular weight counterparts. However, high molecular weight polyolefins can be difficult to process and can be costly to produce. Polyolefins having a bimodal molecular weight distribution are desirable because they can combine the advantageous mechanical properties of high molecular weight fraction with the improved processing properties of the low molecular weight fraction.

For many HDPE applications, polyethylene with enhanced toughness, strength and environmental stress cracking resistance (ESCR) is important. These enhanced properties are more readily attainable with high molecular weight polyethylene. However, as the molecular weight of the polymer increases, the processibility of the resin decreases. By providing a polymer with a broad or bimodal MWD, the desired properties that are characteristic of high molecular weight resin are retained while processability, particularly extrudability, is improved.

There are several methods for the production of bimodal or broad molecular weight distribution resins: melt blending, reactor in series configuration, or single reactor with dual site catalysts. Melt blending suffers from the disadvantages brought on by the requirement of complete homogenisation and from high cost.

Metallocene catalysts are known in the production of polyolefins. For example, EP-A-0619325 describes a process for preparing polyolefins such as polyethylenes having a multimodal or at least bimodal molecular weight distribution. In this process, a catalyst system which includes at least two metallocenes is employed. The metallocenes used are, for example, a bis(cyclopentadienyl)zirconium dichloride and an ethylene-bis(indenyl)zirconium dichloride. By using the two different metallocene catalysts in the same reactor, a molecular weight distribution is obtained which is at least bimodal.

EP-A-0881237 discloses the production of bimodal polyolefins with metallocene catalysts in two reaction zones.

Good pipe resins are produced by blending a low molecular weight high density polyethylene resin having little or no short chain branching (SCB) due to comonomer incorporation with a linear low density polyethylene resin having a high molecular weight and a large amount of short chain branching. For example, PCT/EP01/12417 and PCT/EP01/12420 both describe polyethylene pipe resins prepared from chemical or physical blends of high molecular weight and low molecular weight polyethylene fractions.

For the physical blends, each polymer is produced individually in a reactor and mixed with the other by extrusion. Physical blending is desirable when the polymers to be blended are prepared in very different and mutually incompatible conditions: it often leads to a poor mixing of the melts that leaves large high molecular weight microscopic particles, referred to as gels, embedded in the final product.

For the chemical blends, the product of a first cascade reaction zone, including the olefin monomer, is contacted with the second co-reactant and the catalyst system in a second cascade reaction zone to produce and mix the second polyolefin with the first polyolefin in the second reaction zone. Even chemical blending does not produce a good homogeneity: each grain of the fluff exiting the reactor is composed, to a certain extent, of domains of high molecular weight fractions within a matrix having a lower average molecular weight. Such phase separation could be explained by the distribution of residence times in the two reactors. An extrusion step is thus necessary to disperse the high molecular weight domains. The heterogeneity increases with increasing difference between the molecular weights or between the chemical compositions of the two polymer fractions and, as a result, the homogenisation of the fluff becomes more difficult, even with performing twin-screw extruders.

The mixing of polymers having significantly different chain lengths is ruled by thermodynamics and rheology, even if they are fully compatible. The main problems reside in the very high viscosity of the high molecular weight (HMW) fraction and in the large difference in the viscosities of the two polymer fractions.

Similarly, it can be difficult to incorporate carbon black into a polymer blend prepared with a high molecular weight fraction and a low molecular weight fraction as it is known that the carbon black tends not to enter the high molecular weight fraction.

It can also be difficult to homogeneously disperse into a polymer, fillers, such as for example nanoclay, calcium carbonate, dolomite, $CaSO_4$, silicates, asbestos, kaolin, mica, $BaSO_4$, $Al_2O_3$, graphite, carbon black, carbon fibres, ceramic fibre or talc, because of the very high viscosity of either one component of the matrix (bimodal polymer) or of the whole matrix (high molecular weight polymer). It is especially true if the filler is in very finely divided form such as the nanoparticles of nanoclay.

Current mixing technologies use different types of extruders and mixers such as for examples single and twin-screw extruders, extensional flow mixers or gear pumps. All of these techniques are very inefficient for highly viscous polymer melts having fractions with large viscosity differences or for polymers having large chemical composition differences: it is then necessary to carry out multiple re-extrusions of the product in order to reach an acceptable level of homogeneity. Such multiple re-extrusions can in turn be detrimental to the final quality of the product by producing, for example, chain scission, reticulation, yellowing, odours or degradation of additives.

Reducing the polymer viscosity by way of a proper solvent having a plasticising action could solve the problem, in situations where such a solvent exists. The efficient plasticisers, known in the industry, are however very difficult to remove from the final product after extrusion and therefore permanently affect the properties of the final product.

There is thus a need to produce homogeneous blends of polymers having different molecular weights and viscosities, or having different chemical compositions, by a technique that overcomes the difficulties of the current techniques.

It is an aim of the present invention to provide a plasticiser that is soluble in many polymer melts, effectively reduces the viscosity of the polymers and can easily be removed.

It is another aim of the present invention to prepare homogeneous bi or multi-modal blends of two or more fractions of the same type of polymer and characterised by different molecular weights or of two or more polymers having different chemical compositions.

It is a further aim of the present invention to provide homogeneous blends of polymers and fillers or additives.

Accordingly, the present invention discloses a process for preparing a homogeneous bi- or multi-modal polymer blend comprising the steps of:

a) providing a bi- or multi-modal heterogeneous polymer resin prepared by chemical or physical blend of two or more fractions of the same type of polymer resin, said fractions having different molecular weights or, of two or more polymer resins having different chemical compositions, or both, or providing two or more fractions of the same type of polymer resin, said fractions having different molecular weights or, two or more polymer resins having different chemical compositions, or both;

b) heating the resin(s) of step a) above the softening temperature;

c) after or during heating step b), introducing a supercritical fluid or a mixture of supercritical fluids;

d) mixing at elevated temperature and pressure to reduce the viscosity by at least 10%;

e) removing the supercritical fluid by depressurisation in the molten state; and f) retrieving an homogeneous bi- or multi-modal polymer blend.

Optionally, before removing the supercritical fluid by depressurisation, the melt can be cooled under mixing, until the viscosity has increased back to the value it had after the heating step b) and before mixing with the supercritical fluid.

A gas or liquid at ambient conditions becomes a supercritical fluid (SCF) when it is compressed and heated to conditions above its critical point. As the critical point of a substance is approached, its isothermal compressibility tends to infinity, and thus its molar volume or density changes dramatically. In the critical region, a substance that is a gas at normal conditions exhibits a liquid like density and a much increased solvent capacity that is pressure-dependent. The variable solvent capacity of a supercritical fluid is the basis on which separations processes can be devised. (In Encyclopedia of Polymer Science and Engineering. Second Edition. Eds. H. F. Mark, N. M. Bikales, C. G. Overberger, G. Menges. Volume 16, p 368-399, 1989.)

The critical temperatures of gases and liquids can differ by hundreds of degrees, and this difference suggests the use of specific supercritical fluids in specific applications. The critical temperatures of carbon dioxide, ethane, ethylene are near ambient temperature and thus makes them quite attractive for many applications.

For the present invention, the supercritical fluid can be selected from those gases having their critical point in a range that can be reached under the conditions of the process, i. e., critical temperatures below 400° C., preferably between −50° C. and 350° C. and most preferably between 10° C. and 250° C. and which have critical pressures below 500 bars, preferably between 0.5 and 400 bars and most preferably between 1 and 300 bars. Suitable gases can be selected from carbon dioxide, nitrous oxide, methane, nitrogen, propane, difluorochloromethane, trifluoromethane, ethane and sulphur dioxide or mixtures thereof. Carbon dioxide is preferred for homogeneous blends of polyolefins: it has a critical temperature of 31.1° C. and a critical pressure of 73.8 bars. Supercritical carbon dioxide is soluble in polyolefins such as polyethylene and polypropylene at elevated pressure and temperature and it is easily removed by depressurisation.

Supercritical carbon dioxide has been used in various applications such as, for example, as devolatilisation aid, as foaming agent in the preparation of microcellular foams or in the mixing of immiscible polymers such as described in EP-A-361,247.

The quantity of supercritical gases or mixtures of gases added to the polymers is essentially governed by the different solubility for each gas in the polymer mixture under consideration and is normally of from 0.05 to 20 wt %, based on the total weight of the mixture, preferably, it is of from 0.1 to 12 wt %.

The mixing is carried out in the presence of the supercritical fluid at a temperature of from 50 to 350° C., preferably at a temperature of from 150 to 240° C. and at a pressure of from 80 to 300 bars, preferably from 150 to 200 bars.

The blend is optionally cooled in order to reduce the viscosity down to its starting value just after heating to the softening temperature, and before mixing with the supercritical fluid.

The supercritical fluid is then removed by depressurisation in the molten state.

The present invention also discloses the homogeneous bi- or multi-modal resin blend resulting from a physical or a chemical blend of two or more fractions of the same type of polymer and characterised by different molecular weights or of two or more polymers having different chemical compositions, or both, said homogeneous blend being prepared with a supercritical fluid.

In a preferred embodiment of the present invention, the starting polymers are compatible polyolefins having different molecular weights, a high molecular weight (HMW) fraction and a low molecular weight (LMW) fraction, said fractions being physically or chemically blended to produce a bi-modal heterogeneous polyolefin. The bimodality is characterised by a large value of the ratio $HLMI_{blend}/HLMI_{HMW\,fraction}$: it is larger than 30, preferably larger than 50. HLMI is measured following the method of standard test ASTM D 1238. The measurements are carried out at a temperature of 190° C. for polyethylene and at a temperature of 230° C. for polypropylene. It is observed that the amount of high molecular weight fraction not dispersed in the continuous low molecular weight fraction is less than 2%, for all proportions of the high molecular weight fraction.

The present invention further discloses the use of a supercritical fluid to homogenise a highly heterogeneous bi- or multi-modal polymer resin resulting from a physical or a chemical blend of two or more fractions of the same type of polymer and characterised by different molecular weights or of two or more polymers having different chemical compositions, or both.

The polymers can be any polymer such as for example polyolefins, polyvinylidene fluoride (PVDF), polymethyl methacrylate (PMMA) or polystyrene (PS).

Preferably, the starting bi- or multi-modal polymer of the present invention results from the physical or chemical blend of two or more fractions of the same type of polymer resin, said fractions having different molecular weights.

Preferably, the polymers are polyolefins, more preferably homopolymers or copolymers of ethylene or propylene, and most preferably, homopolymers or copolymers of ethylene.

The present invention further discloses the use of a supercritical fluid to prepare homogeneous blends of one or more polymers with carbon black and/or fillers or additives.

EXAMPLES

Example 1 shows the results obtained with a bimodal polyethylene resin prepared in a double loop reactor with a single metallocene catalyst and treated with supercritical $CO_2$. For comparison (comparative example 1), the same resin was extruded three times in a conventional twin-screw extruder.

Comparative example 2 represents a bimodal polyethylene resin prepared in a double loop reactor with a single metallocene catalyst and extruded three times in a conventional twin-screw extruder.

A. Catalyst Preparation

Ethylene bis(4,5,6,7-tetrahydro-1-indenyl)zirconium dichloride was prepared in accordance with the method of Brintzinger as published in Journal of Organometallic Chemistry, 288 (1985) pages 63 to 67.

50 g of silica were dried in a fluidised bed reactor for 5 hours at 150° C. under a flow of nitrogen.

10 g of the dried silica (1.6 ml/g, 300 m$^2$/g) were suspended with 50 ml toluene at room temperature in a round bottom flask equipped with mechanical stirring and heating devices, an addition funnel and a reflux condenser.

16 g of a MAO solution (30 wt % in tolune) were slowly added in about 5 minutes to the suspension at room temperature. The reaction mixture was heated to toluene reflux and maintained at this temperature for 4 hours under mild stirring.

The suspension was then cooled down and filtered. The resulting white solid was washed three times with 50 ml of fresh toluene.

The silica/MAO product so obtained was re-suspended with 50 ml fresh toluene at room temperature in a round bottom flask equipped with a mechanical stirrer. 0.28 g of metallocene powder was added to the suspension and the reaction mixture was kept under mild stirring at room temperature for 4 hours.

The suspension was then filtered. The final product was successively washed with 50 ml of fresh toluene and four times with 50 ml of pentane. The solid was dried for 12 hours under vacuum.

B. Preparation of the Polyethylene Resin

The manufacture of a polyethylene resin comprising a blend of low molecular weight and high molecular weight ethylene polymers was carried out in suspension in isobutane in two loop reactors connected in series.

Isobutane, ethylene, hydrogen, triisobutyl aluminium (TIBAL) and catalyst (prepared according to the method described in section A above) were continuously introduced into the first loop reactor and the polymerisation of ethylene was carried out in this mixture in order to form the low molecular weight homopolymer. The polymerisation conditions are specified in Table I. The resulting homopolymer was then continuously introduced into a second loop reactor connected to the first loop reactor together with ethylene, 1-hexene and isobutane. The polymerisation of the ethylene and 1-hexene was carried out therein in order to form the high molecular weight copolymer. The suspension comprising the polyethylene resin blend of the low molecular weight and high molecular weight ethylene polymer fractions was continuously withdrawn from the second loop reactor. The suspension was flashed, so as to evaporate the isobutane and the remaining reactants present (ethylene, 1-hexene and hydrogen) and to recover the polyethylene resin in the form of a powder, which was subject to drying in order to complete the de-gasing of the isobutene and hexene. The polymerisation conditions in the second reactor are also specified in Table I.

TABLE I

|  | Example 1 and comparative example 1 | Comparative example 2 |
|---|---|---|
| Reactor 1 |  |  |
| $C_2$ (wt %) | 6.1 | 4.1 |
| Comonomer | — | — |
| $H_2/C_2$ (% mol/mol) | 0.029 | 0.044 |
| T (° C.) | 90 | 90 |
| Residence time (h) | 1.0 | 1.0 |
| Reactor 2 |  |  |
| $C_2$ (wt %) | 7.32 | 8.14 |
| $C_6/C_2$ (wt %/wt %) | 0.071 | 0.078 |
| $H_2/C_2$ (% mol/mol) | — | — |
| T (° C.) | 80 | 80 |
| Residence time (h) | 0.67 | 0.65 |

The properties of both the low molecular weight and high molecular weight polyethylene resin fractions and also of the bimodal polyethylene resins are specified in Table II.

TABLE II

|  | Example 1 and comparative example 1 | Example 2 |
|---|---|---|
| LMW fraction (reactor 1) |  |  |
| Weight (%) | 53 | 56 |
| MI2 (g/10 min) | 152 | 501 |
| Density (kg/m$^3$) | 972 | 975 |
| HMW fraction (reactor 2) |  |  |
| Weight (%) | 47 | 44 |
| HLMI (g/10 min) | 0.03 | 0.03 |
| Density (kg/m$^3$) | 920 | 919 |
| Polyethylene resin blend |  |  |
| Hexene g/kg | 6.8 | 7.2 |
| MI5 (g/10 min) | 0.28 | 0.29 |
| HLMI (g/10 min) | 9.3 | 16.1 |
| Density (kg/m$^3$) | 947.6 | 950.4 |

Figure 1:
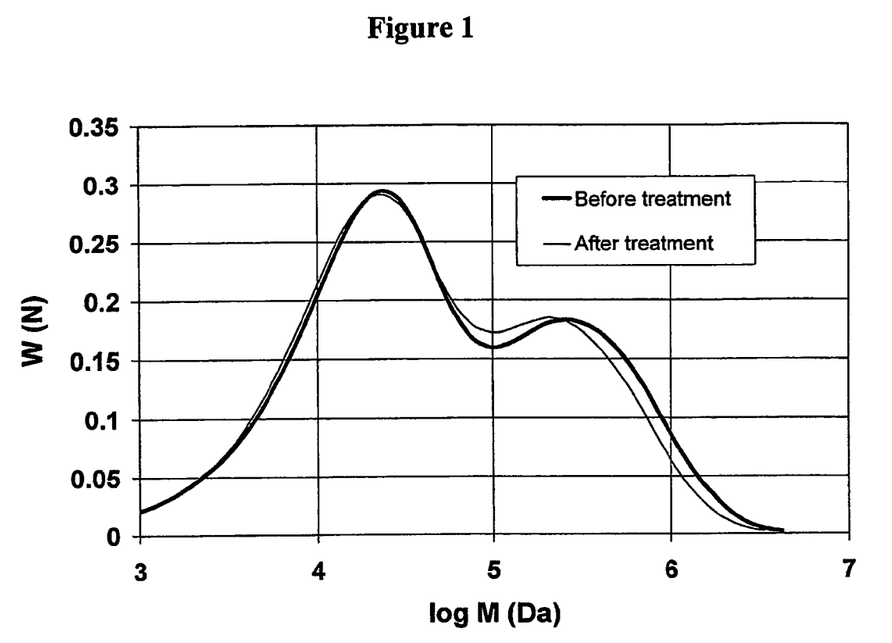
FIG. 1 represents the molecular weight distribution of the bimodal polyethylene of example I before and after treatment with supercritical $CO_2$.

The polyethylene of Example 1 had a well-marked bimodal character as shown in the molecular weight distribution represented in FIG. 1. The very heterogeneous morphology of the bimodal resin directly collected from the two reactors in series is exhibited in FIG. 2 that represents a photograph of a section of a grain fluff as seen through an optical microscope equipped with a phase-contrast device. It is seen that the high molecular weight fraction, appearing in dark colour on the photograph, is concentrated in well-defined regions and is clearly separated from the continuous low molecular weight fraction appearing in light colour.

A conventional package of antioxidants was added to the polyethylene and both were introduced in the Couette viscometer, together with the $CO_2$ under high temperature and high pressure (supercritical). The Couette viscometer is completely described in "A novel Couette Viscometer for polymer solutions in supercritical fluids" by J-H Oh and J. T. Lindt, to be published in SPE Conference Proceedings in May 2002. The mixing takes place at low strain rates for long periods of time, typically at strain rates of from 0.1 to 1 s-1. Although the strain rates are very low, the total average strain experienced by the melts are comparable to those encountered in conventional extruders with shorter residence time. The viscosity measurements are carried out, during mixing, in the Couette viscometer.

Figure 3:
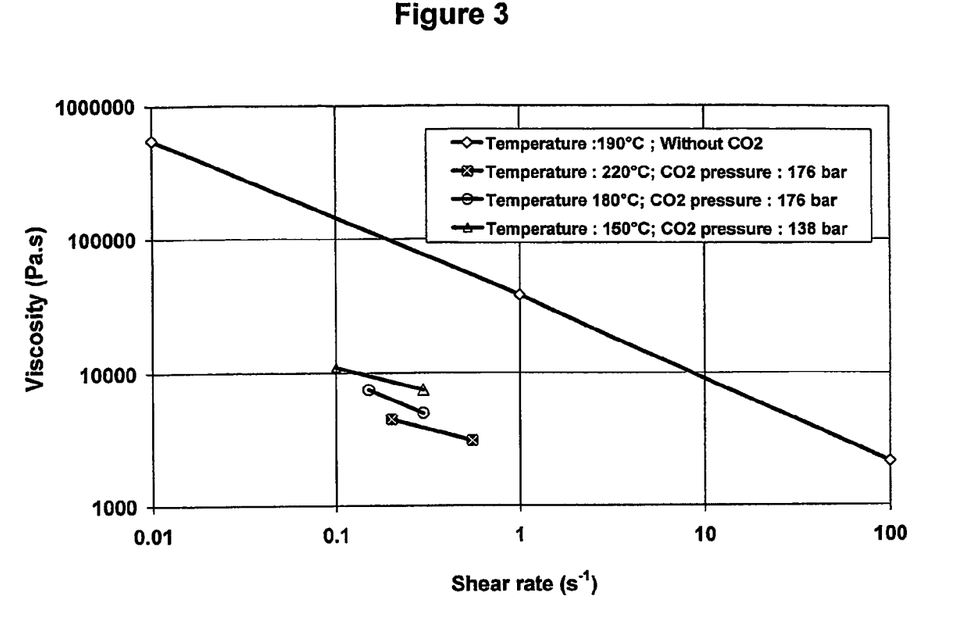
FIG. 3 represents the viscosity expressed in Pa·s as a function of shear rate expressed in s-1 for the resin of example 1 treated with and without supercritical $CO_2$ and at different temperatures (expressed in ° C.) and concentrations of $CO_2$ (expressed in bars).

The product was mixed at a temperature ranging between 150 and 240° C., with a $CO_2$ pressure of 180 bars, during 52 hours and with shear rates ranging from 0.1 to 1 s-1. Although the strain rates appear very low, the total average strain experienced by the melt is comparable to that encountered in conventional extruders because the shearing was applied for a long period of time. The reduction of the viscosity for the resins according to the present invention is shown in FIG. 3 that represents the viscosity expressed in Pa·s as a function of shear rate expressed in s-1 for various resins. It is observed that the viscosity is reduced by a factor of about 10.

Figure 2:
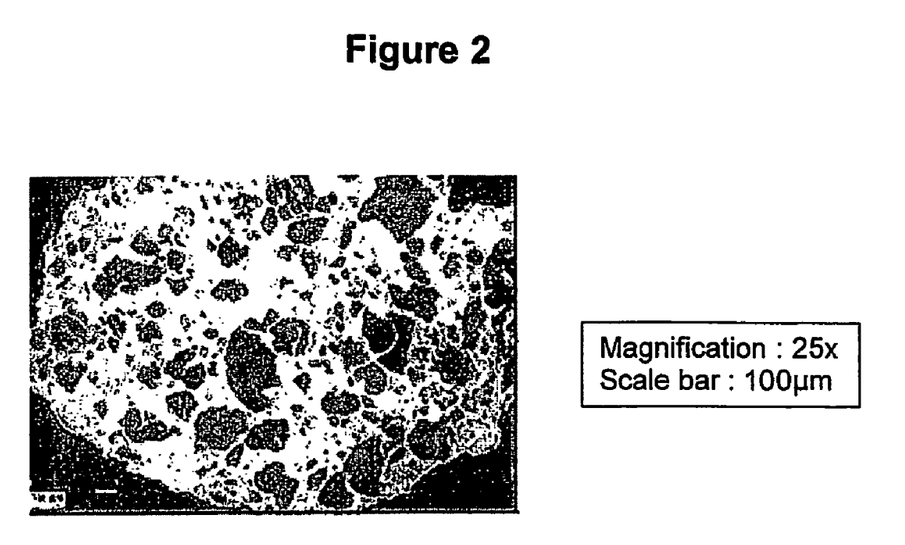
FIG. 2 represents the photograph of a section of the untreated grain fluff of the bimodal polyethylene of example 1, as seen through an optical microscope equipped with a phase-contrast device.
Figure 4:
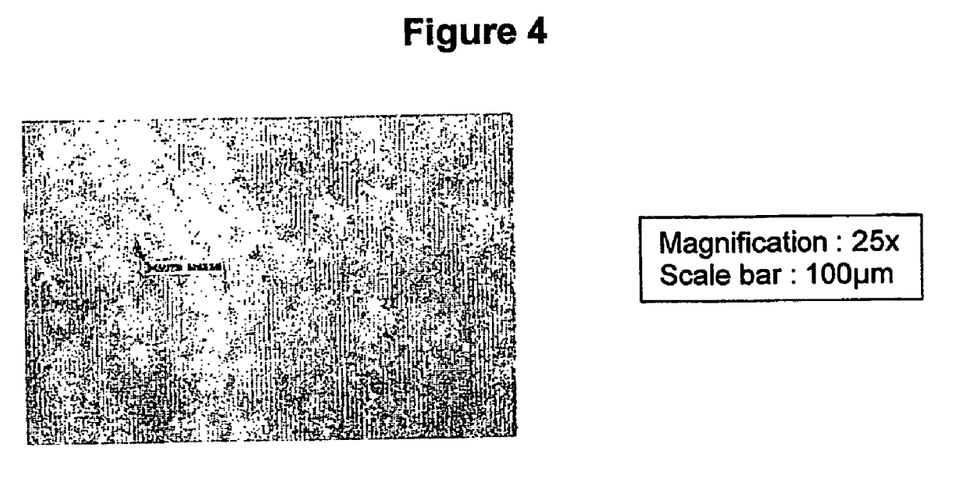
FIG. 4 represents the photograph of a pellet section of the bimodal polyethylene of example 1 after treatment with supercritical $CO_2$ as seen through an optical microscope equipped with a phase-contrast device.

The combined effects of the reduced viscosity and of the total average shear strain result in a dramatically increased homogeneity as exhibited in FIG. 4 that represents a photograph under the same optical microscope as that of FIG. 2, of the polyethylene of Example 1 after treatment in the Couette viscometer with supercritical $CO_2$. Less than 1% of the high molecular fraction was not dispersed in the continuous low molecular weight fraction.

It can be seen on FIG. 1, that also represents the molecular weight distribution of the polyethylene of Example 1 in the Couette viscometer, that the resin has not been degraded by the long residence time in the mixing equipment. It can be seen indeed, that the molecular weight of the polyethylene has not been reduced and thus that the reduction in viscosity is not the result of a reduction in molecular weight.

Figure 5:
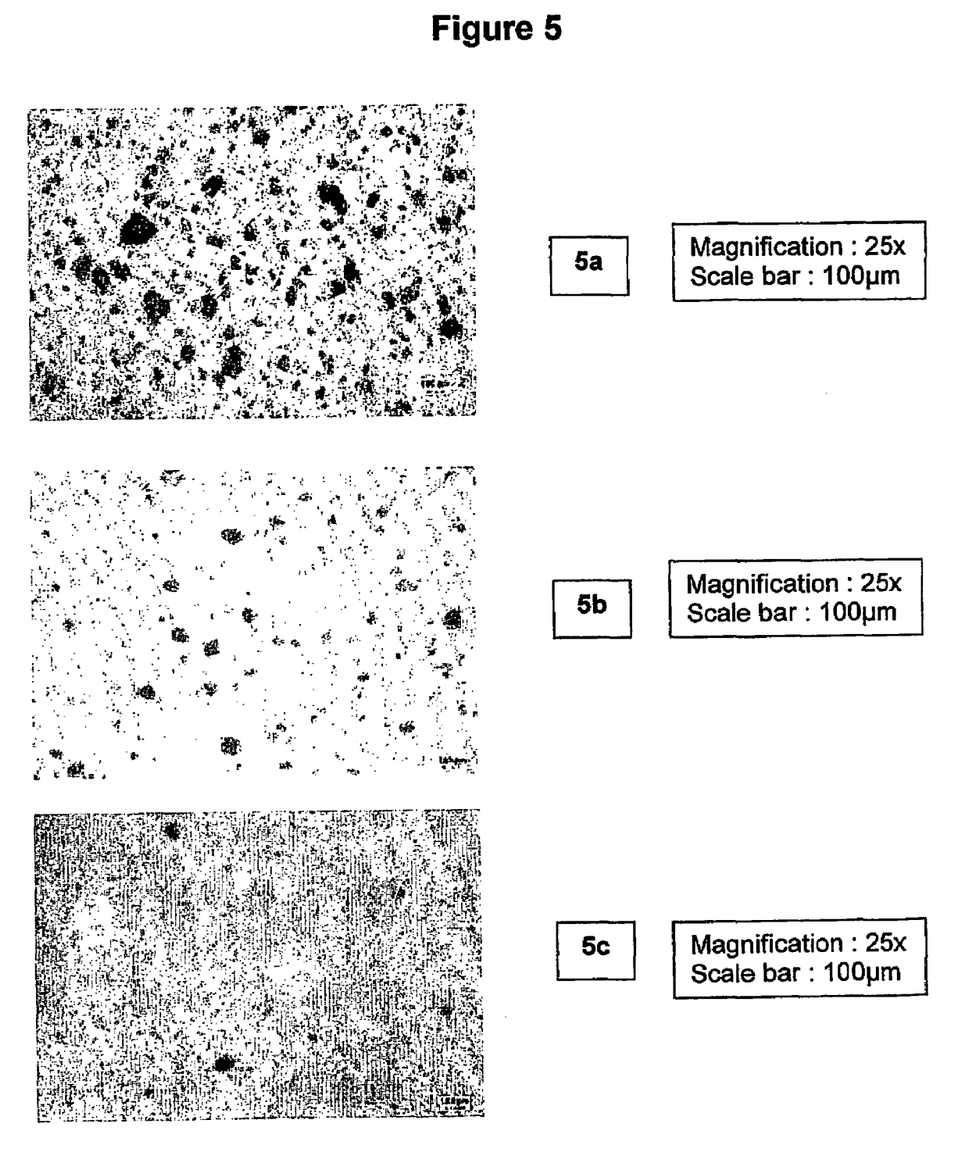
FIGS. 5a, 5b and 5c represent photographs of a pellet section of the bimodal polyethylene of example 1, not treated with supercritical $CO_2$, and respectively after one, two and three extrusions, as seen through an optical microscope equipped with a phase-contrast device.

For comparison, the polyethylene of Example 1 was extruded three times in a performing co-rotating twin-screw extruder Brabender at 220° C. and it was pelletised. A sample of the product was retrieved after each extrusion and observed under the same optical microscope as that of FIG. 2. The results are presented in FIGS. 5a, 5b and 5c that represent photographs, under the same optical microscope as that of FIG. 2, of a pellet section respectively after one, two and three extrusions. The product heterogeneity decreases after each extrusion, but the final dispersion after three extrusions does not match that of the sample treated according to the present invention.

Figure 6:
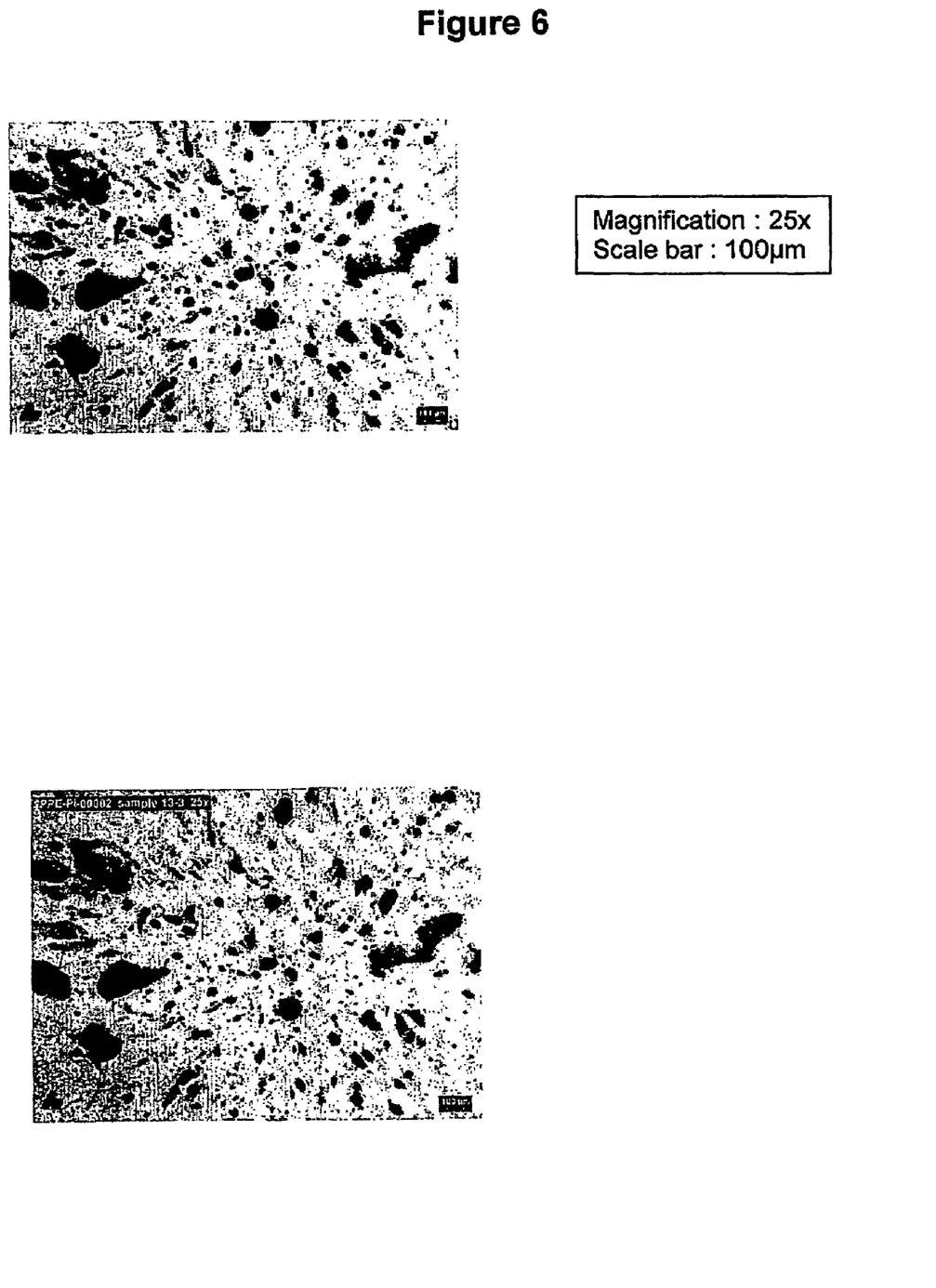
FIG. 6 represents the photograph photographs of a pellet section of the bimodal polyethylene of example 1 after one extrusion in an industrial extruder, as seen through an optical microscope equipped with a phase-contrast device.

The polyethylene of Example 1 was also extruded in industrial-like conditions, once, in a co-rotating twin-screw extruder Werner & Pfleiderer ZSK58 having one melting zone and one homogenisation zone, under smooth conditions, with a temperature of 230° C., a rotation speed of 15 RPM and a lower specific energy of 217 kW/ton. The result is presented in FIG. 6 that represents a photograph, under the same optical microscope as that of FIG. 2, of a pellet section. The dispersion is very poor.

The polyethylene of comparative example 2 is also highly bimodal and heterogeneous. It has a high ratio $HLMI_{blend}/HLMI_{HMW\,fraction}$ of 537. After one, two and three successive extrusions in the industrial twin-screw extruder Werner & Pfleiderer ZSK58 at a temperature of 210° C., a rotation speed of 280 RPM and a high specific energy of 448 kW/ton, the percentages of undispersed high molecular weight fractions were respectively 26.5, 7.2 and 2.7%.

Three blends have been prepared with polyethylene resins prepared using various catalyst systems and blended in various proportions. The properties of the resins are displayed in Table III. The properties of the blends are displayed in Table IV.

TABLE III

| Resin | Density (g/cm³) | HLMI (g/10 min) | Mn (k) | Mw (k) | Catalyst |
|---|---|---|---|---|---|
| R1 | 0.925 | 0.077 | 124 | 424 | Cp-Flu |
| R2 | 0.927 | 0.15 | 40.8 | 526 | ZN |
| R3 | 0.914 | 0.2 | 53.8 | 590 | ZN |
| R4 | 0.938 | 0.06 | 76.2 | 696 | ZN |

| | Density (g/cm³) | MI2 (g/10 min) | Mn (k) | Mw (k) | |
|---|---|---|---|---|---|
| R5 | 0.967 | 56 | 12.7 | 50.5 | THI |
| R6 | 0.96 | 1.4 | 22.4 | 117 | ZN |
| R7 | 0.967 | 28 | 11.7 | 63 | ZN |

Cp-Flu represents a metallocene catalyst of the cyclopentadienyl-fluorenyl type, ZN a Ziegler-Natta catalyst and THI a metallocene catalyst of the tetrahydro-indenyl type. The resins R1 to R4 are linear low density polyethyle resins and resins R5 to R7 are high density polyethylene resins.

TABLE IV

| Blend Composition % | Density (g/cm³) | HLMI (g/10 min) | Mn (k) | Mw (k) |
|---|---|---|---|---|
| B1 44% R1/56% R2 | 0.951 | 6.6 | 22.7 | 234 |
| B2 20% R2/80% R6 | 0.954 | 12.1 | 25.7 | 205 |
| B3 11% R3/28% R4/61% R7 | 0.956 | 14 | 17.8 | 378 |

These blends extruded without supercritical carbon dioxide were very heterogeneous and presented between 18 and 25% of high density polyethylene that was not dissolved in the continuous low molecular weight fraction. When extruded with supercritical carbon dioxide they all exhibited a very good level of homogeneity with less than 2% of undissolved high density polyethylene.

The supercritical fluid is thus very efficient in reducing the viscosity. It can also modify the polarity and thereby allows a more homogeneous mixing of fillers, nanofillers and additives.

The invention claimed is:

1. A process for preparing a homogeneous bimodal polyethylene blend comprising:
    (a) providing a bimodal heterogeneous polyethylene resin comprising a blend of at least two polyethylene fractions which differ in molecular weight; wherein said blend has a high molecular weight (HMW) fraction and a low molecular weight (LMW) fraction and has a bimodality characterized by a ratio of a high load melt index of the blend ($HLMI_{blend}$) to a high load melt index of a high molecular weight fraction ($HLMI_{HMW\,fraction}$) which is greater than 30,
    (b) heating said resin to a temperature greater than the softening temperature of said resin;
    (c) concomitantly with or subsequent to said heating, introducing a supercritical fluid into said resin, wherein said fluid is selected from the group consisting of carbon dioxide, nitrous oxide, methane, nitrogen, propane, difluorochloromethane, trifluoromethane, ethane, ethylene, sulphur dioxide and mixtures thereof;
(d) mixing said resin and said fluid at an elevated temperature and pressure to reduce the viscosity of said resin by at least 10%;
(e) removing the supercritical fluid by reducing the pressure on said resin in the molten state; and
(f) recovering a homogeneous bimodal polyethylene blend.

2. A process for preparing a homogeneous bimodal polyethylene blend comprising:
(a) providing a bimodal heterogeneous polyethylene resin comprising a blend of a high molecular weight (HMW) polyethylene fraction and a low molecular (LMW) polyethylene fraction, wherein said blend has a bimodality characterized by a ratio of a high load melt index of the blend ($HLMI_{blend}$) to a high load melt index of the high molecular weight fraction ($HLMI_{HMW}$) of at least 50;
(b) heating said resin to a temperature greater than the softening temperature of said resin;
(c) concomitantly with or subsequent to said heating, introducing a supercritical fluid into said resin, wherein said fluid is selected from the group consisting of carbon dioxide, nitrous oxide, methane, nitrogen, propane, difluorochloromethane, trifluoromethane, ethane, ethylene, sulphur dioxide and mixtures thereof;
(d) mixing said resin and said fluid at an elevated temperature and pressure to reduce the viscosity of said resin by at least 10%;
(e) removing the supercritical fluid by reducing the pressure on said resin in the molten state; and
(f) recovering a homogeneous bimodal polyethylene blend.

* * * * *